Nov. 24, 1970 W. L. HATTON ET AL 3,543,161

COMMUNICATION EVALUATION SYSTEM

Filed Oct. 3, 1967 7 Sheets-Sheet 1

COMMUNICATION EVALUATION SYSTEM

3,543,161
COMMUNICATION EVALUATION SYSTEM

Walter L. Hatton, Ottawa, Ontario, Canada, George W. Jull, Bromley, England, and Donald F. Page, Everett E. Stevens, and William D. Hindson, Ottawa, Ontario, Canada, assignors to Her Majesty, The Queen in Right of Canada as represented by the Minister of National Defence Filed Oct. 3, 1967, Ser. No. 672,559
Claims priority, application Canada, Oct. 13, 1966, 972,876
Int. Cl. H04b *1/00, 1/15, 1/38*
U.S. Cl. 325—65 14 Claims

ABSTRACT OF THE DISCLOSURE

Evaluating apparatus for evaluating a plurality of communication channels between an aircraft and a ground station in a ground-to-air communciation system including apparatus at the ground station for measuring the interference level on each channel and encoding apparatus at the ground station providing encoded signals indicative of the interference level measurements. A transmitter at the ground station is arranged to transmit the encoded signals which are received and decoded in the aircraft whose receiver is synchronized to the ground station transmitter. Apparatus for measuring the signal strength is also provided and the ratio of signal-to-interference level of the channels is determined whereby an indication is given as to those channels which are better for communication use.

This invention relates to communication systems for communication between two or more points.

Communication systems for communication between two stations usually include a plurality of communication channels, one of which is selected by the operators for transmitting messages. In operation, the communication operators often have to manually switch from one channel to the next and to try each channel to determine if effective communication is possible on that channel between the two stations. A considerable time is thus spent in establishing such communications between two ground stations and especially between a ground station and an aircraft. In fact, in some cases, such trial and error methods do not lead to the establishment of communication for a considerable time because this is sometimes dependent on both operators being on the same channel at the same time.

Even when communication is established between, for example, an aircraft and a ground station, this may not be the best available channel and substantial interference or noise may be experienced. Quite often the operators continue to use the first channel which they find available and this often means that some channels are not used very much in practice, even though they might provide better communication if the operators had tested them—this is a disadvantage in practice. It is also a disadvantage of previous systems that reliable communication is not achieved because previous systems merely measured the path loss and not the signal-to-interference ratio.

It is an object from one aspect of the present invention to provide apparatus and a method for use in communication systems in which the above-mentioned disadvantages are obviated or substantially reduced.

Accordingly there is provided apparatus for evaluating a plurality of communication channels between two points to determine that communication channel or those channels between said two points on which the signal-to-interference ratio is high enough for reliable communication between said two points including a transmitter located at a first of said points and capable of transmitting a signal over any one of a plurality of communication channels between said two points, a receiver located at the second of said two points and capable of receiving signals from said transmitter, means for causing said transmitter to transmit on each of said channels in succession, means for measuring the interference level on each of said channels in succession at the first point, means for encoding the interference level measurement for each channel and causing said transmitter to transmit the encoded information on the repective channel means, for decoding the encoded information at said second point, a synchronizing means for synchronizing said receiver with said transmitter whereby it is capable of receiving signals on that channel on which the transmitter is transmitting, means at said second point for measuring the signal level on each channel, and means for providing an indication as to on which channel or channels the signal-to-interference level is above a predetermined level and high enough for reliable communication.

The present invention also provides apparatus for evaluating a plurality of comumnication channels between two points to determine that communication channel or those channels between said two points on which the signal-to-interference ratio is high enough for reliable communication between said two points including a transmitter located at a first of said points and capable of transmitting a signal over any one of a plurality of communication channels between said two points, a receiver located at the second of said two points and capable of receiving signals from said transmitter, means for measuring the interference level on each of said channels in succession, means for causing said transmitter to transmit on each of said channels in succession an indication of the interference level measurement for the respective channel, synchronizing means for synchronizing said receiver with said transmitter whereby it is capable of receiving signals on that channel on which the transmitter is transmitting, means at said second point for measuring the signal level on each channel, and means for providing an indication as to on which channel or channels the signal-to-interference level is above a predetermined level and high enough for reliable communication.

The invention also provides a method of evaluating a plurality of communication channels between two points to determine that communication channel or those channels between said two points on which the signal-to-interference ratio is high enough for reliable communication between said two points including the steps of providing a transmitter located at a first of said points capable of transmitting a signal over any one of a plurality of communication channels between said two points, providing a receiver located at the second of said two points and capable of receiving signals from said transmitter, measuring the interference level on each of said channels in succession, causing said transmitter to transmit on each of said channels in succession an indication of the interference level measurement for the respective channel, synchronizing said receiver with said transmitter whereby it is capable of receiving signals on that channel on which the transmitter is transmitting, measuring the signal level on each channel, and providing an indication as to on which chanel or channels the signal-to-interference level is above a predetermined level and high enough for reliable communication.

From another aspect the present invention provides apparatus for establishing communication between two points including a transmitter located at a first of said points and capable of transmitting a signal over any one of a plurality of communication channels between said two points, a receiver located at the second of said two points and capable of receiving signals from said transmitter, means for causing said transmitter to transmit on each of said channels in succession, synchronizing means for synchronizing said receiver with said transmitter whereby it is capable of receiving signals on that channel on which the transmiter is transmitting, and means for providing a call signal for transmission by said transmitter to provide an indication at said receiver as to which channel is to be used for communication.

From this aspect there is also provided a method of establishing communication between two points including the steps of providing a transmitter located at a first of said points capable of transmitting a signal over any one of a plurality of communication channels between said two points, providing a receiver located at the second of said two points and capable of receiving signals from said transmitter, causing said transmitter to transmit on each of said channels in succession, synchronizing said receiver with said transmitter whereby it is capable of receiving signals on that channel on which the transmitter is transmitting, and providing a call signal for transmission by said transmitter to provide an indication at said receiver as to which channel is to be used for communication.

The invention also provides a method of determining the signal strength of an input signal including the step of adding sufficient noise to said input signal to ensure that the "threshold signal level" is the required fraction of the total input voltage.

An embodiment of the invention will now be described, by way of example, with reference to the accompanying drawings, in which.

Figure 1:
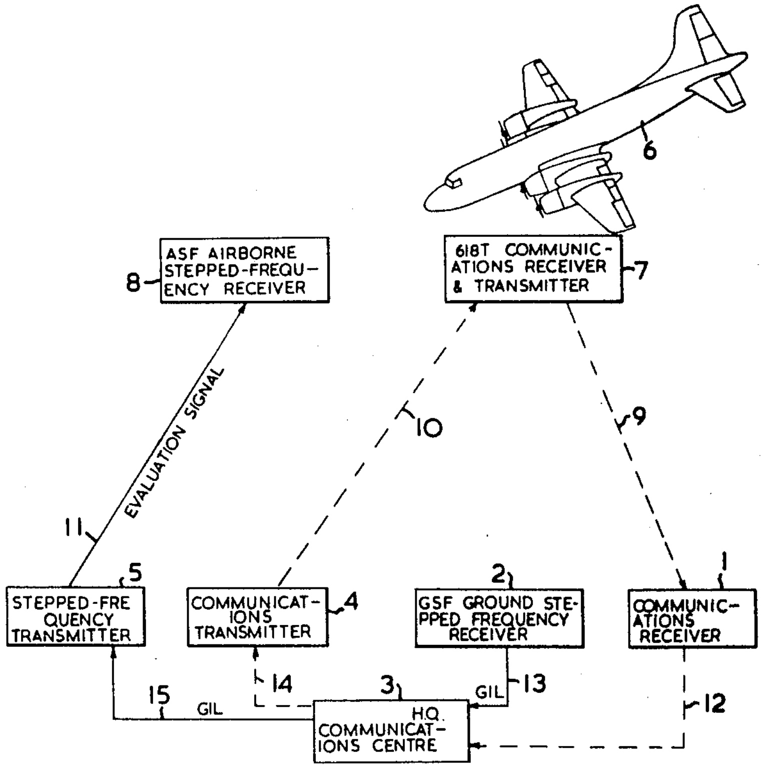
FIG. 1 is a diagrammatic representation of a communication system for establishing communication between two stations, one of which is a ground station whilst the other is an aircraft.
Figure 2:
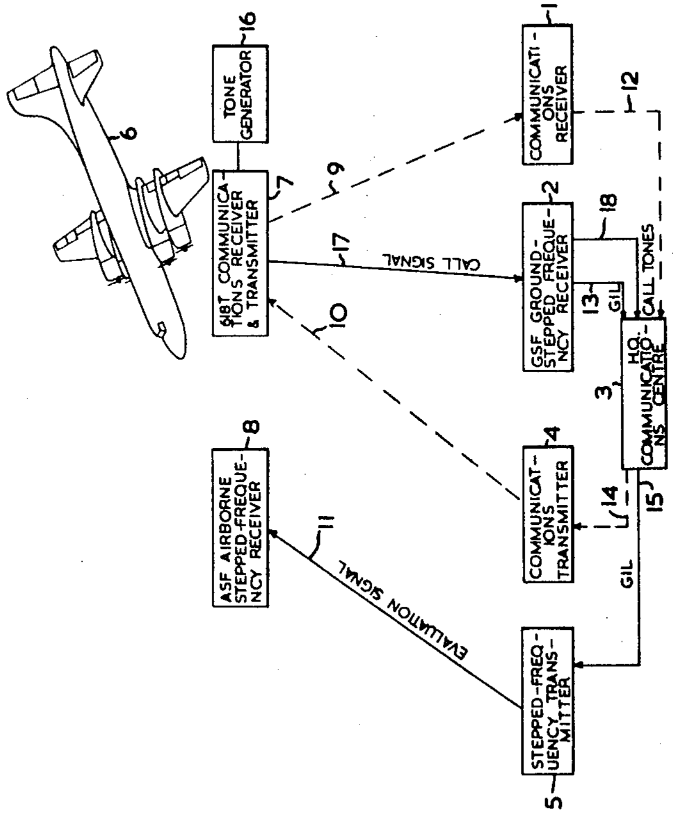
FIG. 2 is a diagrammatic representation similar to FIG. 1 but including further features for inclusion in the communication system.
Figure 3:
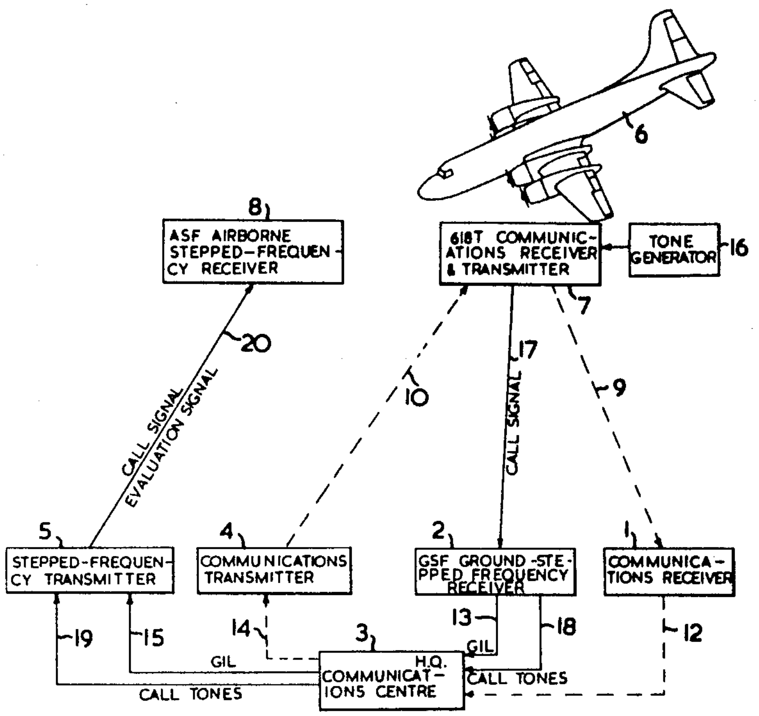
FIG. 3 is a diagrammatic representation similar to FIGS. 1 and 2 but including still further additional features for use in the communication system.
Figure 6:
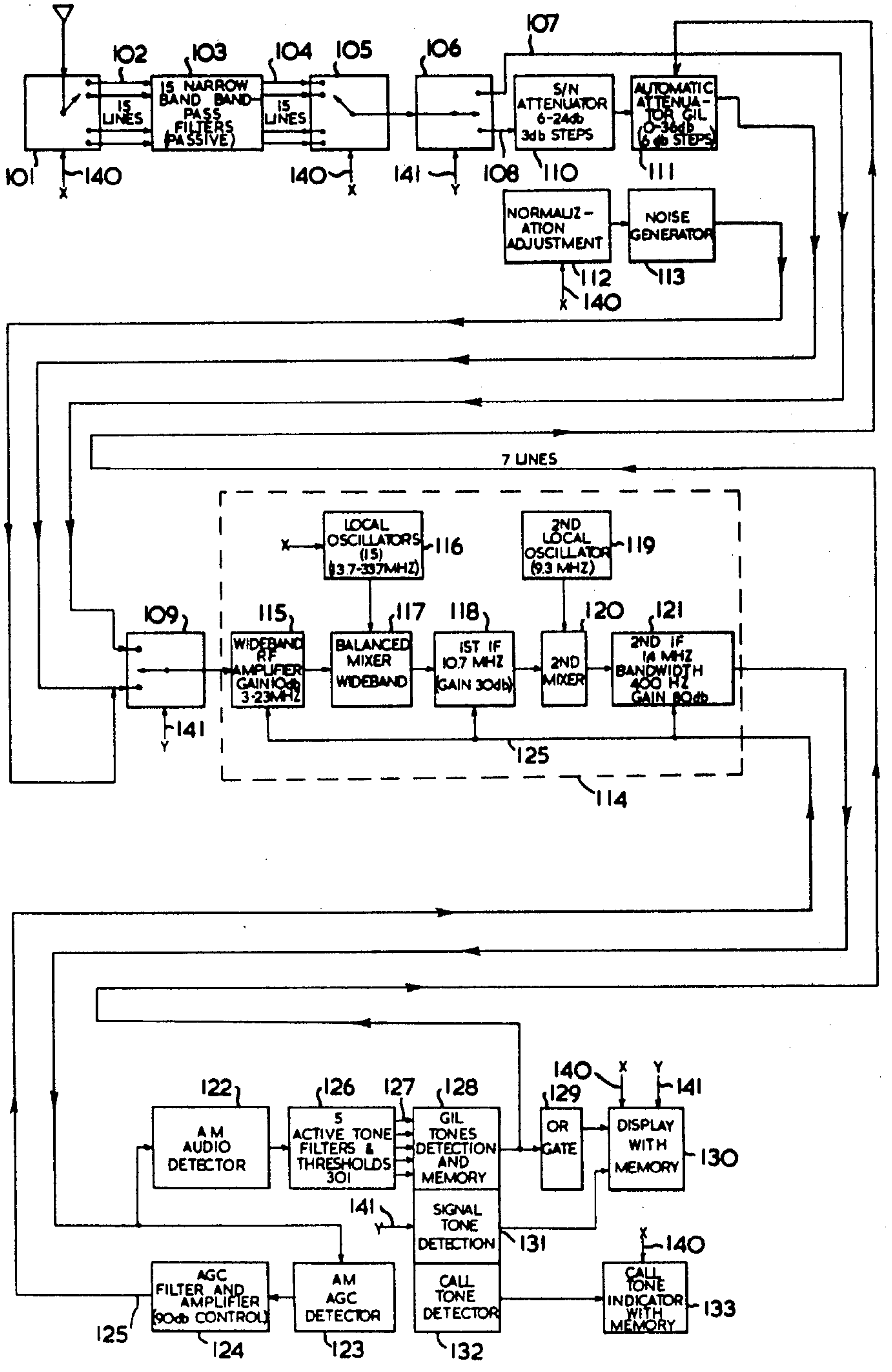
Figure 7:
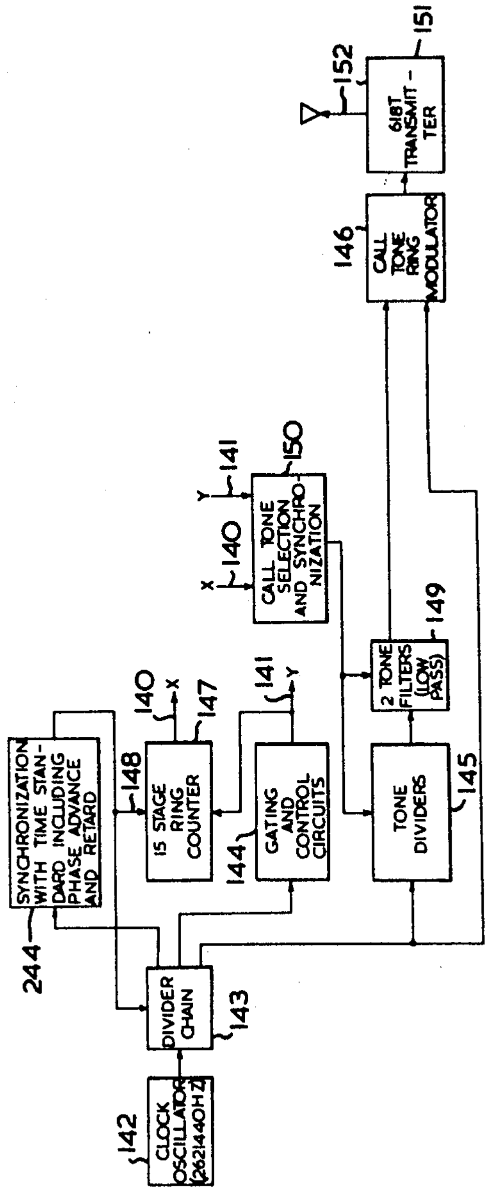

FIG. 6 is a diagrammatic representation of a stepped frequency receiver which may be provided in the aircraft of FIGS. 1, 2 and 3; and FIG. 7 is a diagrammatic representation of additional apparatus which is provided in the aircraft's stepped frequency receiver of FIGS. 1, 2 and 3 together with a diagrammatic representation of a communications transmitter which is provided in the aircraft of FIGS. 1, 2 and 3.

The same reference numerals are applied to like units throughout the figures.

In FIG. 1, the ground station comprises an antenna (not shown) connected to a communications receiver 1 and a stepped frequency receiver 2 which are in turn connected to a communications control center 3. The communications control center 3 also controls a communication transmitter 4 and a stepped frequency transmitter 5 connected to suitable antennae.

In aircraft 6 there is provided a type 618T communications receiver and transmitter 7 and a stepped frequency receiver 8 utilizing a common antenna.

A plurality of communication channels are provided between the aircraft 6 and the ground station, for example, 15 or 16 channels, and it will be appreciated that the communication paths may be several thousand miles in length and it is desirable to use the most effective channels and also to establish communication with the least delay in time.

It will be appreciated that the communication paths between the first and second stations according to this invention may be by land line or by radio paths. In the embodiment of FIG. 1 the communication between the ground station and the aircraft is of course through space and the communication paths between the ground station and the aircraft are indicated as 9, 10 and 11. The connection between the communications receiver and the stepped frequency receiver, the communications transmitter, and the stepped frequency transmitter, to the headquarters communications center 3 may of course be by a radio link or alternatively by land lines. The paths of communication are identified in FIG. 1 by the numerals 12, 13, 14 or 15.

In FIG. 2, there is shown a channel evaluation system similar to that of FIG. 1 but including the provision of a "call signal" system. A tone generator 16 is provided in the aircraft and is so designed that it can cause call tones to be transmitted by the aircraft transmitter for reception by the ground stepped frequency receiver—it will be appreciated that this receiver may, in some arrangements, also measure the ground interference level of received signals which will include those from the aircraft.

It will be appreciated that the primary function of the ground stepped frequency receiver is to monitor the background interference level on the various communications channels, but that in addition it can be used to detect the presence of call signals. In this specification, it will be understood that the expression "call signal" includes all types of advisory signals, e.g., message acknowledgment signals comprising narrow-band, short duration messages, which are not strictly part of the information message to be communicated.

In FIG. 3, there is shown a system similar to those of FIGS. 1 and 2 but there is provided the additional facility of transmitting call signals from the ground station for reception by the stepped frequency receiver in the aircraft.

Call tones from the headquarters communication center 3 in FIG. 3 may be transmitted over a path 19 to the ground station stepped frequency transmitter which then sends these call signals over a communication channel identified as 20 in FIG. 3 to the stepped frequency receiver 8 in aircraft 6.

Figure 4:
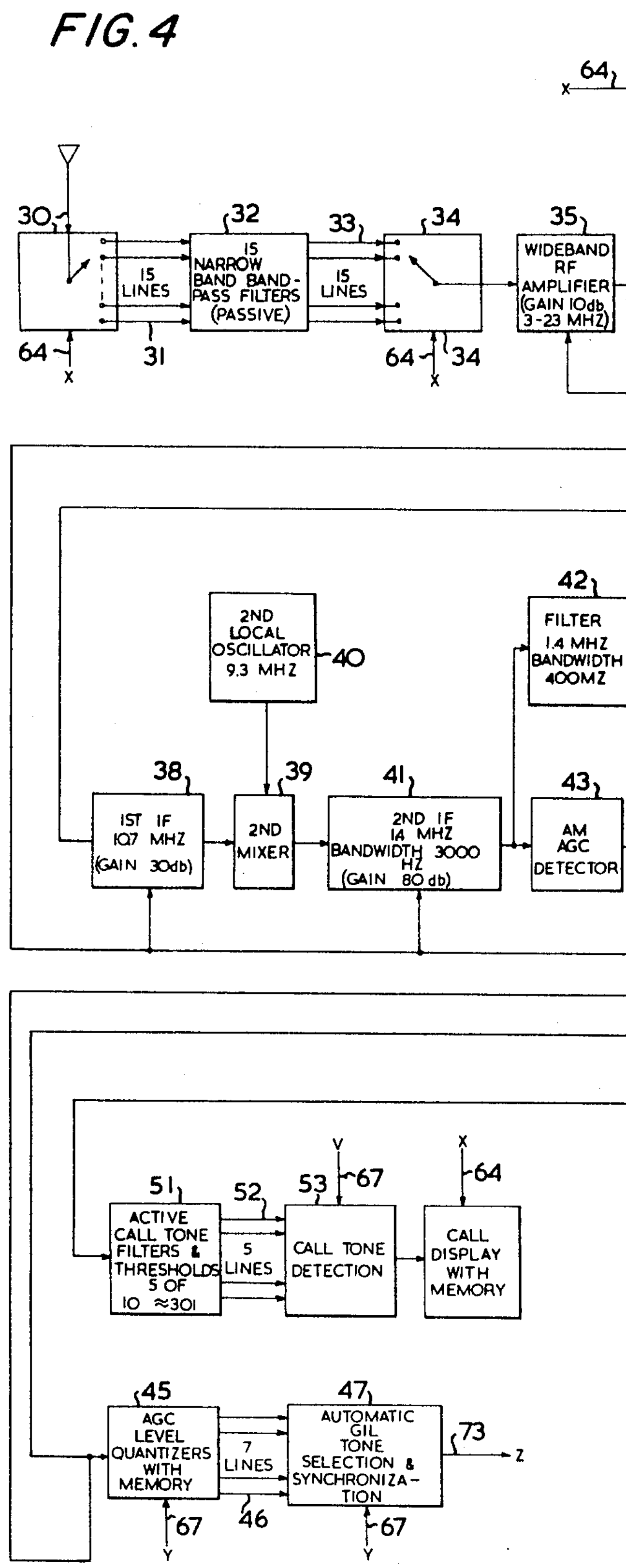
FIG. 4 is a diagrammatic representation of a stepped frequency receiver which may be utilized in the ground station of FIGS. 1, 2 and 3.

FIG. 4 diagrammatically illustrates the construction of the ground station stepped frequency receiver 2 of FIGS. 1, 2 and 3. The receiver is shown as capable of handling 15 communication channels between the aircraft and the ground station and includes an antenna system 30 for supplying received signals on any one of 15 lines 31 to a corresponding one of 15 narrow band-pass filters 32. The output of each band-pass filter 15 is fed along a respective line 33 to a selector switch 34 and thence to a wide-band RF amplifier 35 having a gain of 10 dbs in the range 3 to 23 megacycles per second. The output of amplifier 35 is fed to a wide-band balanced mixer 36 having an associated set of 15 local oscillators 37 which operate in the frequency range 13.7 to 33.7 megacycles per second (abbreviated as $MH_3$ or mc./s.).

As will be seen in FIG. 4, the output of the mixer 36 is fed to a first IF amplifier 38 tuned to 10.7 megacycles per second and having a gain of 30 dbs and whose output feeds a second mixer stage 39 having an associated second local oscillator 40 capable of supplying an oscillator signal at 9.3 megacycles per second. The output of the second mixer 39 is fed to a second IF amplifier 41 tuned to 1.4 megacycles per second, having a gain of 80 dbs and a band-width of 3000 cycles per second. Its output is supplied to a filter 42 tuned to 1.4 megacycles per second and a band-width of 400 megacycles per second, and also to a detector stage 43 which, after detection, supplies an input to an A.G.C. filter and amplifier stage 44 whose output is fed to a stage 45 incorporating A.G.C. level quantizers with memory. The output of stage 45 is fed over 7 lines 46 to a stage 47 which is identified as an automatic ground interference level (G.I.L.) tone selection and synchronizing stage.

An output from the filter 42 is connected to the input of an AM audio detector stage 50 whose output is connected to a stage 51 identified as an active call tone filter stage. This supplies an output along one of 5 lines 52 to a call tone detection stage 53 which controls a call display stage 54 incorporating memory facilities.

A feedback connection is provided from the output of the A.G.C. filter and amplifier stage 44 to the wide-band RF amplifier 35, the first IF stage 38 and the second IF stage 41 as shown in FIG. 4.

Figure 5:
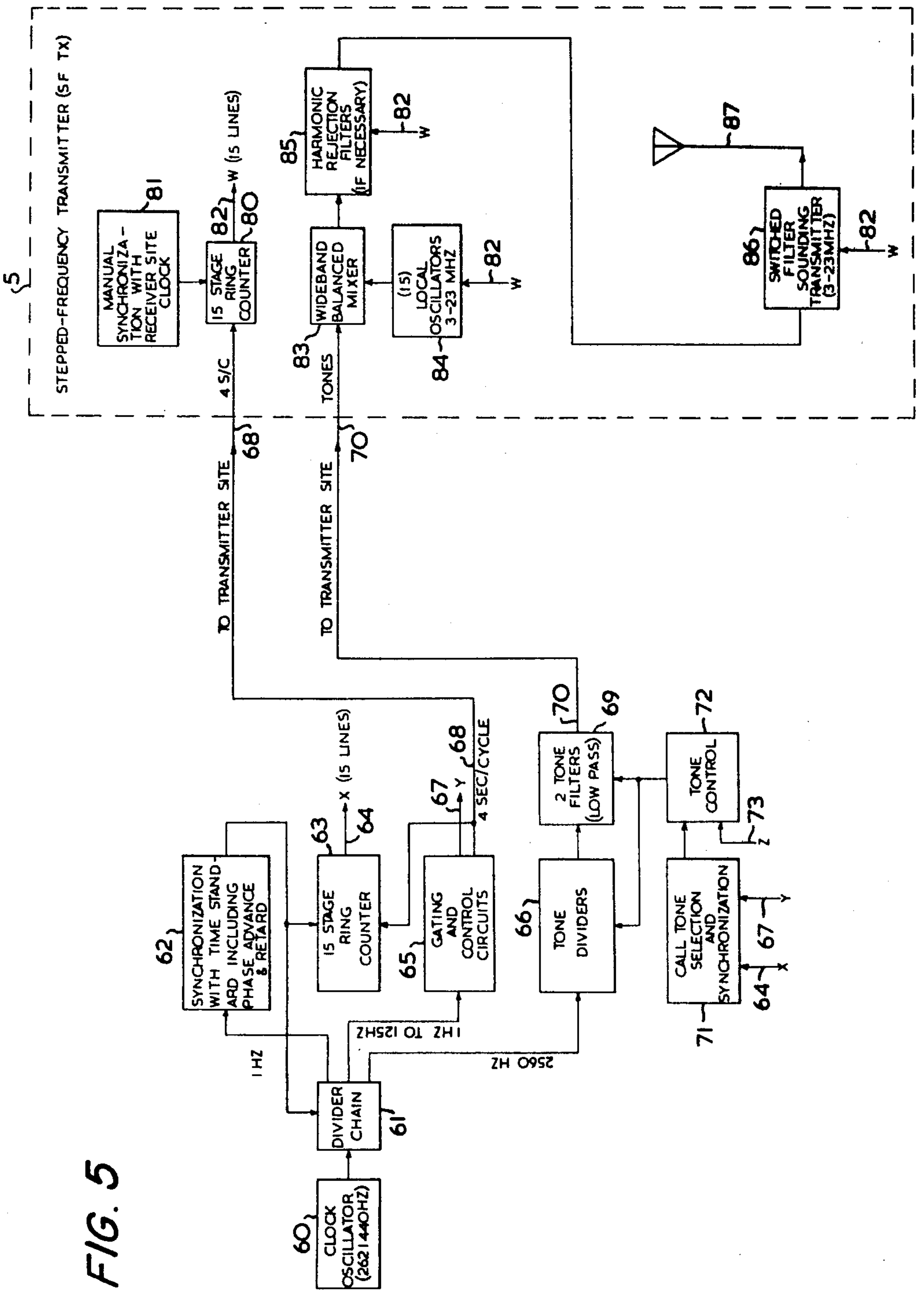
FIG. 5 is a diagrammatic representation of additional apparatus which is provided at the ground station stepped frequency receiver of FIGS. 1, 2 and 3 together with a diagrammatic representation of a stepped frequency transmitter which may be provided in the ground station of FIGS. 1, 2 and 3.

In FIG. 5, there is shown part of the additional apparatus which is provided at the ground station stepped frequency receiver of FIGS. 1, 2 and 3 together with the stepped frequency transmitter 5 forming part of the ground station in FIGS. 1, 2 and 3.

A master clock oscillator stage 60 is provided operational at a frequency of 2,621,440 cycles per second and this supplies an output to a divider chain 61. In order to ensure a synchronization of the whole system no matter whereabouts in the world aircraft may be flying, a synchronization is achieved by synchronizing to the CHU or WWV International Time Standards and it has been found in practice that by using internal clocks an accuracy to within 0.1 seconds variation per week may be achieved. For this reason, a stage 62 is connected to the divider chain 61 to allow synchronization with time standards and includes phase advance and retard. An output from stage 62 is also supplied to a 15 stage ring counter 63 which supplies synchronization and switching control signals in turn along each of 15 lines 64 connected to the stages 30, 34 and 37 of the receiver as will be clear from FIG. 4.

As will be seen from FIG. 5, the first output of the divider chain 61 is connected to the input of the synchronization unit 62, the second output of divider chain 61 is connected to the input of a stage 65 comprising gating and control circuits whilst the third output is connected to the input of a tone divider stage 66. The output to stage 62 is at 1 cycle per second, the output to stage 65 is in the frequency range 1 cycle per second to 125 cycles per second whilst the output to the tone divider stage 66 is at a frequency of 2,560 cycles per second.

The gating and control circuits 65 provide two outputs, one of which Y contains various timing signals and appears on line 67 and is supplied to stages 45, 47 and 53 of the ground stepped frequency receiver of FIG. 4 as well as to a further stage in FIG. 6. A second output of the gating and control circuit stage 65 is fed along a line 68 to the stepped frequency transmitted 5 at the transmitter side of the ground station.

The output of the tone divider stage 66 is fed to 2 tone low pass filters in stage 69 which supplies an output along a line 70 to the stepped frequency transmitter 5 located at the ground station transmitter site.

A call tone selection synchronization stage 71 and a tone control stage 72 are also provided, stage 71 receiving an input from stages 63 and 65 on lines 64 and 67 and supplying an output to the tone control stage 72 which also receives an input on line 73 from the automatic G.I.L. tone selection and synchronization stage 47 of FIG. 4. The output of tone control stage 72 is fed to the tone divider stage 66 and the 2 tone filters of stage 69.

In the stepped frequency transmitter 5 the signals on line 68 are fed to a 15 stage ring counter 80 which also receives an input from a stage 81 which allows manual synchronization with the receiver clock. An output is obtained from the stage 80 on the 15 lines identified as 82 and is fed to the stages to be described shortly.

The tone signals on line 70 are fed to a wide-band balanced mixer 83 which receives oscillator signals from stage 84 which incorporates 15 local oscillators in the range from 3 to 23 megacycles per second. The output of the balanced mixer stage 83 is fed an optional harmonic rejection filter stage 85 whose output is connected to the switched filter sounding transmitter stage 86. Stage 86 feeds into the antenna array 87 of the ground station transmitter. Control signals from the ring counter stage 80 are fed along the 15 lines 82 to an input of stages 84, 85 and 86 as shown in FIG. 5.

In FIG. 6, there is diagrammatically illustrated a stepped frequency receiver for use in the aircraft of FIGS. 1, 2 and 3. This includes an antenna stage 101 which supplies received signals along a selected one of 15 lines 102 to a selected one of 15 narrow band-pass filters in a filter stage 103. The output of filter stage 103 is fed along one of 15 lines 104 to control switching stages 105 and 106 which are capable of supplying a signal along lines 107 or 108. Line 107 is connected to one input of a further switching stage 109, the other input of stage 109 being supplied with signals from line 108 via an attenuator stage 110 and an automatic attenuator stage 111. A normalization adjustment stage 112 is connected to a noise generator stage 113 whose output is also connected to the other input of switching stage 109 as will be clear from FIG. 6.

The output of switching stage 109 is ocnnected to the input of the main receiver 114. This comprises a wide-band RF amplifier 115 and 15 local oscillators 116 feeding into a balanced mixer stage 117 whose output is connected to the first IF stage 118. The output of the first IF stage 118 and the output of a second local oscillator stage 119 are connected to a second mixer stage 120 whose output is connected to a second IF amplifier stage 121. The output of the second IF amplifier stage 121 comprises the output of the main receiver 114 and is fed to AM audio detector stage 122 and to an AM, A.G.C. detector stage 123. The output of detector stage 123 is connected to an A.G.C. filter and amplifier stage 124 which supplies feedback along line 125 to the amplifier stage 115, the first IF stage 118, and the second IF stage 121 as will be clear from FIG. 6.

The output of the AM audio detector stage feeds into a filter stage 126 capable of supplying a tone signal along any one of 5 lines 127 to a tone detection and memory stage 128. The output of stage 128 is connected through an OR gate 129 to a display unit having memory facilities. This may be quite a simple arrangement involving two lamps for each communication channel or alternatively might comprise a more sophisticated display arrangement.

The display unit 130 also includes a second input capable of receiving a signal from a signal tone detection stage 131 associated with the detection stage 128. Further associated tone detection stage 132 is shown in FIG. 6 and is capable of supplying a signal to a call tone indicator stage 133 incorporating memory facilities.

Stages 101, 105, 112, 116, 130 and 133 are provided with control input connections on lines 140 whereby synchronizing signals can be provided from a ring counter in the aircraft's transmitter circuits, as will be explained below. Similarly, stages 106, 109, 131 and 141 may receive control signals on lines 141 from a gating and control stage in the aircraft's receiver.

FIG. 7, is a diagrammatic representation of the timing and control system of the receiver which is provided in the aircraft. A communications transmitter is also indicated. The circuit is similar to that at the ground station and comprises a crystal controlled clock oscillator stage 142 capable of oscillating at a frequency of 2,621,440 cycles per second and feeding into a divider chain 143 with which is associated a synchronization stage 244 to ensure synchronization with CHU or WWV International Time Standards. An accuracy to within 0.1 second per week may thus be achieved.

An output from divider chain 143 is supplied to a gating and control stage 144 and a further output is supplied to a tone divider stage 145 as well as to one input of a call tone ring modulator stage 146. The gating and control stage 144 supplies an output on line 141 to provide control signals to the stepped frequency receiver in the aircraft as mentioned above. It also supplies a control signal to a 15 stage ring counter stage 147 having another input 148 which is supplied with signals from the synchronization stage 144 whereby synchronization output signals may be provided by stage 147 along lines 140 to the respective stages in the aircraft's stepped frequency receiver as mentioned above.

The output of tone divider stage 145 is fed to a 2 tone filter stage 149, stages 145 and 149 having further inputs which are connected to an output of a call tone selection and synchronization stage 150 which is itself supplied with synchronization signals or pulses on lines 140 and 141 from the respective stages 147 and 144.

The output of the 2 tone filter stage 149 is fed to the other input of the call tone ring modulator stage 146 whose output feeds a standard type 618T transmitter stage 151 having an antenna 152.

The detailed construction and operation of the stages illustrated in FIGS. 4, 5, 6 and 7 will not be described in detail as their construction and operation will be clear to anyone skilled in this particular art and having regard to the operation of the embodiments disclosed in FIGS. 1, 2 and 3.

In the embodiment to FIG. 1, measurement of the noise interference level could be made for each communication channel either at the ground station or in the aircraft or in both the aircraft and at the ground station. However, in practice it was found to be sufficient to measure the interference level at the ground station (G.I.L. equals ground interference level) and the signal level at the aircraft.

In use, the aircraft 6 of FIG. 1 may wish to communicate with the ground station over the best communication channel. The apparatus in the aircraft has been continuously and automatically operating to evaluate in sequence each channel which is available to the aircraft's radio operator. This is achieved by the GSF receiver 2 considering the G.I.L. signal for each communication channel and selecting a respective one of 5 different tone signals which are designed to provide an indication of the relative magnitudes of the various interference levels on the different communication channels. The various tone signals are sent along paths 13 and 15 to the ground station stepped frequency transmitter 5 which thus transmits the various tone signals, i.e., evaluation signals, and these are received by the aircraft stepped frequency receiver, decoded, and used to control in part the acceptance threshold for a second transmission from transmitter 5 on that channel of a reference signal tone. In addition, the radio operator in the aircraft is provided with controls which also allow him to set, in part, the acceptance threshold for the reference signal tone.

The combined action of the automatic control and the manual control is to determine how strong a received signal from the SF transmitter 5 will be considered acceptable at ASF receiver 8. The higher the measured background noise measured by GSF receiver 2, the higher the received reference signal threshold will be set by the automatic control in ASF receiver 8. The higher the required signal-to-interference ratio desired by the aircraft radio operator, the higher he will set the manual control on the reference signal threshold.

In the display shown in FIG. 6, item 130, two bulbs (or a similar binary display) are assigned to each channel. One bulb is lit if a GIL tone is detected on that channel, indicating that propagation is possible on that channel since the tone transmission was received. The second bulb is lit if the signal tone exceeds the composite threshold set by the automatic and manual controls. The latter measurement can be calibrated as a signal-to-interference ratio. Note that the measured ratio is $$\frac{\text{received signal strength at the aircraft}}{\text{interference level at the ground}}$$

whereas, by initial calibration of the system, this can be a measure of $$\frac{\text{estimated received signal strength at the ground}}{\text{interference level at the ground}}$$

In practice an operator merely looks at the signal/interference lamps to see which channels are acceptable.

As the system steps through the communication channels, several may, of course, be indicated as acceptable and therefore several lamps may be illuminated in the aircraft. In this case the operator could, if he so wishes, reset the threshold setting controls in order that the acceptable reference signal strength is increased.

It will be appreciated that the noise level may be measured by the ground station and the noise level may also be measured in the aircraft. The panel in the aircraft could then include a plurality of sets of 3 lamps, each set corresponding to a particular communication channel. A first lamp in each pair would indicate when the ground station G.I.L. tone was received, the second lamp in the same set would indicate when the aircraft apparatus had measured the reference signal level on the same communication channel as acceptable and the third channel would indicate when the signal-to-interference ratio at the aircraft was acceptable. Illumination of three lamps in a set would then be indicative of the corresponding communication channel being acceptable in both directions.

Once a satisfactory communication channel is selected, then communication between the aircraft and the ground station can proceed in the normal way by means of the transmitter in the aircraft stage 7 and the communications receiver 1 at the ground station. It will be appreciated that the ground receivers 1 and 2 may be incorporated in a single unit as also may the ground transmitters 4 and 5 and the units 7 and 8 in the aircraft 6.

FIG. 2 is similar to FIG. 1 except that it also includes a call system whereby the operator in the aircraft can transmit a call signal for reception by the ground station to indicate that the aircraft wishes to communicate with the ground station. The call signal is generated in a tone generator 16 transmitted by the transmitter in stage 7 along a path 17 for reception by the ground station stepped frequency receiver 2 which sends the call signal along the path 18 to to communication center 3. The tone (or tone sequence) signal is transmitted over the particular communication channel which has been indicated to, and selected by, the aircraft operator as being acceptable as a result of the evaluation process which resulted in one or more lamps being illuminated on the airplane's panel. The additional system may be called an "air-ground call system" and reception of the call signal indicates to the ground station radio operators that:

(1) a particular aircraft has a message for transmission, and (2) the message will be transmitted on that particular communication channel and at the corresponding communication frequency.

The air-ground CALL system and the ground-air EVALUATION system, thus provide a closed-loop (ground-air-ground) system which may be called the channel evaluation and call system (CHEC system). This combined system allows both air and ground operators to know the optimum conmmunication frequency which should be used for message transmission. The CALL system could, if desired, be extended for ground-to-air calling but without much difficulty.

In FIG. 3, there is shown a communication system similar to FIG. 2 but including a CALL tone system both at the ground station and in the aircraft. The call tones from the communication center 3 (or the tone sequences) are sent along a path 19 to the stepped frequency transmitter 5 and are then transmitted over the channel 20 for reception by the aircraft stepped frequency receiver 8.

The invention as described above has been the subject of experiments to determine its possibilities in practice. The following description includes some details of the actual equipment used, the operating conditions and other relevant information. It is to be appreciated that it may well be applicable only to one particular embodiment which was constructed and found to be satisfactory, even when the aircraft was several thousand miles from the ground station. However, the system did correspond to the system described above with reference to FIGS. 1 to 7.

It is to be noted that the evaluation procedure described for the trials consisted of a separate evaluation of reference signal level and ground interference level by the ASF receiver. This has since been modified (and is described here elsewhere) so that the received G.I.L. tone modifies the acceptance level for the reefrence signal tone, and a single evaluation of signal-to-interference ratio is made.

Some of the details and characteristics of the channel evaluation and call (CHEC) system used in the trials are given below.

Ground Stepped-Frequency Transmitter (SFT$x$) Installation

Power—1–5 kilowatts
Frequency Range—3–23 mHz.
Tuning:
(1) Stepped in 100 milliseconds
(2) 4–5 seconds on each frequency
Modulation—Double-sideband, suppressed-carrier Input Tones (50–300 mHz.)
(1) Signal tone—From GSF R$x$
(2) Interference tones—From GSF R$x$
(3) Calling tone sequence, from ground-air calling unit
Antenna—Vertically polarized logarithmic periodic.

Ground Stepped Frequency Receiver (GSF R$x$)

Tuning:
Stepped in time synchronism with SFT$x$ but advanced by one frequency step.
Frequency stability of 1 ppm.
Sensitivity—Maximum sensitivity 10 db. above thermal noise.
AGC Range—1–10,000 microvolts at receiver input.
AGC Response—None for envelope frequencies above 100 Hz.
Predetection Bandwidth—Two parallel second IF amplifiers provided
(1) 400 Hz. for air-ground call reception
(2) 3000 Hz. to match 618T communications receiver, for interference reception.
Output:
(1) Ground interference tones between 50 Hz. and 200 Hz., corresponding to a number of detected energy levels (in 6 db steps) in the 3000 Hz. IF amplifier.
(2) Air-ground call display—Corresponding to air-ground calling tones, between 50 Hz. and 200 Hz., in the 400 Hz., IF amplifier.

Airborne Stepped Frequency Receiver (ASF R$x$)

Tuning:
Stepped in time synchronism with SFT$x$
Frequency stability of 1 p.p.m.
Sensitixity—Maximum sensitivity 10 db above thermal noise.
AGC Range—.3–10,000 microvolts at receiver input AGC Response—None for envelope frequencies above 100 Hz.
Predetection Bandwith—400 Hz.
Output:
(1) All-channel display showing whether or not the ratio $$\frac{\text{estimated received signal strength at ground}}{\text{measured ground interference level}} = \frac{S}{I} \text{ exceeds a preselected value}$$

(2) All-channel display showing presence of detectable evaluation signal.
(3) All-channel display showing presence of ground-air call.

These displays could be moving charts or paper-tape, and/or lights.

Controls—Multiposition switch for selection of acceptable $S/I$ ratio

The present upper limit of the aeronautical bands is 23 mHz. It is desirable to extend this upper limit, particularly for long distance communications during period of high solar activity.

Synchronization Units (at SFT$x$ or GSF R$x$, and at ASF R$x$)-

Clock generation of the necessary timing pulses for step-tuning and re-cycling, and for defining the periods of the following operations:

(1) signal measurement
(2) ground interference measurement
(3) call tone generation and detection Provision for manual syynchronization of these timing pulses to time standard transmissions (CHU or WWV, etc.)

Drift of timing pulses to be within 100 milliseconds in any period up to one week.

Call Tone Generator—Ground-Air (at communication center)

Call tones between 50 Hz. and 200 Hz. used to DSBSC-modulate the SFT$x$.

Manual selection of channel(s), with period of modulation automatically timed for reception by the ASF R$x$(s).

Call Tone Generator—Air-Ground (airborne)

Subcarrier between 500 Hz. and 2800 Hz. is DSBSC-modulated by a call tone between 50 Hz. and 200 Hz.

This total signal used to SSB-modulate the 618T transmitter.

Manual selection of channel with period of modulation automatically timed for reception by GSF R$x$.

In practice it was found that the channel evaluation and call system which was actually used provided more than just sounding (path loss) information to the radio operator since it also gave him information as to whether or not the available signal-to-noise ratio on the air-ground path exceeded a particular value. To facilitate this, two measurements were performed on each signed frequency. The communication system used was similar to that described with reference to FIGS. 1 to 7 except that 16 communication channels were provided. The operation of the systems used was as follows:

First, the received signal strength at the Airborne Stepped Frequency Receiver (ASF R$x$) was measured for a standard transmission (75 c.p.s. tone) from a ground-based Stepped Frequency Transmitter (SFT$x$). From prior calibration of the system, this signal strength could be related to the signal strength expected at the ground station for communications from the aircraft.

Second, by means of a ground-based Stepped Frequency Receiver (GSF R$x$), the interference level at the ground station (GIL) was monitored on each frequency. This GIL information was encoded on the SFT$x$ transmission, and was decoded by the ASF R$x$ in the aircraft. These two measurements, namely, the signal strength and the GIL, were separately displayed at the ASF R$x$ for each frequency, by a pair of lamps. If the signal strength exceeded a threshold level $Sc$, preset by the aircraft radio operator, one lamp was illuminated. If the GIL was less than a maximum level (GIL)$o$, also preset by the radio operator, the second lamp was illuminated. If both lamps were illuminated, then for a communications transmission from the aircraft at that frequency, the estimated signal-to-noise ratio at the ground could be said to exceed the desired value, $Sc/(GIL)o$. This measured ratio is designated $S/I$. This process was repeated at each frequency, a total of 64 seconds being required for the evaluation of 16 assigned frequencies.

The heart of both the ASF and GSF receiver units was a double conversion receiver, with the following properties:

(a) Capability of evaluating a total of 16 assigned channels, with up to 4 channels in any of the 10 HF aeronautical bands;

(b) Oven regulated, crystal controlled local oscillators with center frequency stability of 1 part in $10^6$ under all operating conditions;

(c) 80 db of AGC control. The audio output was held to within 1 db for input signals from 1 watt to 10 watts. The AGC filter was designed to allow full AGC for modulation below 5 c.p.s., with no effect on modulation above 100 c.p.s.

(d) Crystal filters were used in both first and second IF amplifiers. The final predetection bandwidth was 4000 c.p.s., offset from the carrier frequency to give a passband from 3 kc./s. above the assigned carrier frequency to 1 kc./s. below. This passband allowed the receiver to cover the 3 kc./s. communication band and also to cover the evaluation tones which were symmetrical sidebands around the carrier frequency.

(e) 10 parallel RF filter amplifiers were provided at the front end of the receivers one for each of the 10 HF aeronautical bands. The RF image rejection was better than 60 db and the IF rejection was better than 50 db.

The ASF receiver was used to measure the absolute signal level received from the SF transmitter. The basic receiver with its signal tone detector was calibrated to light the appropriate lamp when the desired signal at the receiver input exceeded a "threshold signal level" of 1$\mu$ volt. By preceding the basic receiver with an adjustable attenuator, the acceptable receiver signal level from the antenna could be set to any value greater than 1$\mu$ volt.

The principles behind the threshold calibration are as follows:

(1) Because of the tight AGC, the receiver RMS audio (noise+tones) output was held to a fixed value.

(2) The signal tone detector illuminated the appropriate lamp when the signal exceeded a predetermined fraction of the total output voltage. Since the fraction of desired signal was essentially constant through the receiver, signal calibration was effected by adding sufficient noise at the input to ensure that the "threshold signal level" of 1$\mu$ watt was the required fraction of the total input voltage.

For each evaluated frequency, one of 5 GIL tones was transmitted by the SF transmitter, the tone frequency chosen depending on the channel noise measured by the GSF receiver. This tone caused one of 5 tone filters and detectors to operate in the ASF receiver. The acceptable level of GIL was preset by the aircraft radio operator by means of a control on the ASF receiver. If the decoded GIL tone corresponded to a channel noise (at the ground) less than the preset level, the appropriate lamp was lit on the display panel.

In the calibration of the evaluation sub-system, a measurement was made of path loss on the complete air-ground link relative to the path loss on the complete ground-air link. From this calibration the evaluation signal strength received by the ASF R$x$ could be related to the signal strength that was received at the ground for communications transmitted from the aircraft.

A complication arose at the aircraft end, where, the relative path losses became frequency dependent because the communications transmitter was automatically matched to the antenna while the ASF receiver was not. To calibrate out this frequency dependence, the input sensitivity of the ASF receiver was made to have a frequency dependence which was the inverse of the communication transmitter. This input sensitivity was calibrated for each channel by a separate adjustment of the input noise generator.

Signal-to-noise measurement at the aircraft was possible during the tests but was not utilized to any great extent. In the measurement, the noise above 1.3 kc./s. in the audio output of the ASF receiver was compared in amplitude to the total audio output while the GIL tone was present, and the ratio calibrated directly in signal-to-noise ratio.

The AGC level of the GSF receiver was used as the measure of background noise on each assigned frequency. This AGC was first passed through a filter with a 300 millisecond time constant, to provide averaging of input noise. The filtered level was then fed to a bank of DC level sensors with thresholds calibrated to correspond to 6 db increases in receiver input level. The outputs of the level sensors were fed to a tone control circuit, which assigned a different tone for each of the 6 db levels. A total of 5 tones was used during the trials corresponding to:

Tone:

1—noise$\leq$2.5 $\mu$v.
2—2.5 $\mu$v.$\leq$noise$\leq$5 $\mu$v.
3—5 $\mu$v.$\leq$noise$\leq$10 $\mu$v.
4—10 $\mu$v.$\leq$noise$\leq$20 $\mu$v.
5—20 $\mu$v.$\leq$noise During the trials, a 12 db pad was inserted for night operation (when background noise is higher) to increase the noise for a given tone by a factor of 4. This effectively gave two additional GIL threshold levels.

For the purposes of the trials, a Marconi AN/SRA-502A wide-band distributed amplifier was used at the Ground Station to provide 250 watt sounding transmissions. The GIL and signal tones were modulated on the carrier in a double sideband, suppressed carrier ring modulator. The unwanted harmonics of the carrier were removed by low pass filters, the filtered signals then being amplified to drive the Marconi transmitter. The antenna used was a Granger 747.V3/30 vertically polarized log-periodic array.

In the trials, the same antenna was used for transmitting soundings as was used for receiving and transmitting communications from and to the aircraft.

Timing sequence and system synchronization

The evaluation process at each assigned channel frequency took 4 seconds. For the first two seconds, the GSF receiver monitored the channel noise (GIL). During the third and fourth seconds the SF transmitter transmitted at that channel frequency with a tone modulation. During the third second, this modulation was a reference 75 c.p.s. tone, and during the fourth second the modulation consists of one of five GIL tones corresponding to the GIL measured by the GSF receiver. Also during the third and fourth seconds the ASF receiver was operated on the assigned frequency—during the third second with the noise generator and signal attenuator in circuit permitting measurement of received signal strength, and during the fourth second the GIL tone was decoded, with the attenuator and noise generator removed. This process was repeated for each of the sixteen assignments; the complete sweep took 64 seconds and could be repeated as often as once every two minutes.

The ASF receiver, GSF receiver, SF transmitter were held in synchronism by internal clocks, accurate to within 0.1 second in one week. These clocks were manually synchronized with CHU or WWV time standards using the following procedure:

*Step 1: Set 1 second/cycle bulb.*—Compare 1 sec. pip from standard time signal with turn on of 1 s./c. bulb. Depress switch marked SET 1 s./c. until turn ON of 1 s./c. bulb is coincident with pip.

*Step 2: Reset 2 s./c.*—At the one minute or 30 sec. pip on a standard time signal count one, on the next second's pip count two, on the next count three and depress the switch marked RESET 2 s./c. At the count of three the 1 s./c. bulb will turn ON. Remove finger from the RESET 2 s./c. switch when the 1 s./c. bulb turns OFF.

*Step 3: Reset 4–300 s./c.*—The resetting must be done after the five minute group on the standard time signal, i.e., on the hour, five minutes past, ten minutes past, five minutes before, etc. At the five minute pip count one, at the next pip count two and depress the reset switch during the ON period of the 1 s./c. bulb.

*Step 4: Reset 10–60 min./cycle.*—Depress the reset button for a short time between the hour marker on the standard time signal and five minutes past the hour. This step was required only when the sweep repetition rate was less than once each five minutes.

In the trials only four of the 16 assigned frequencies were monitored by communications receivers at the ground station. Periods of up to one hour elapsed between sets of messages from the sounder-assisted radio operator. On certain occasions in the initial flights when ionospheric conditions changed rapidly, it was found that the four monitoring receivers were tuned to frequencies which were no longer usable; on those occasions it was not possible to initiate air-ground contact. To circumvent this problem in the later flights, the air-ground call arrangement, previously described, was devised making use of the ground-based stepped receiver as an all-channel call monitor. The addition of this feature to the evaluation system required the addition of only two small units—a tone modulator connected to the 618T transceiver in the aircraft, and a tone detector at the GSF receiver on the ground.

A subcarrier of approximately 2000 c.p.s. was a double-sideband suppressed carrier modulated by an 81.5 c.p.s. tone. The resulting signal was used to modulate the upper sideband 618T communications transmitter. The frequency of transmission was selected with the assistance of the channel evaluator. On the ground the GSF receiver, during its stepping sequence, automatically monitored the selected call frequency. The audio output of the GSF receiver was connected to a call tone detector which gave an indication when the 81.5 c.p.s. modulation was present.

During the trials, the following results were obtained for a single-tone call:

(a) *Threshold of Single-tone Calling.*—The reliability of detection of a call tone was compared with the communication system error rate. Operation of the 163 Hz. filter was acceptable at a *S/I* ratio which gave character error rates of less than approximately 30% on an FSK teletype message. In the 65 hours of operation, signalling was attempted 96 times. It was not received on 18 of these attempts; however, on 16 of these occasions, the evaluation display in the aircraft predicted that the channel was unusable for teletype communications. The majority of these failures occurred while attempting to bracket the sensitivity of the calling by using marginal channels.

(b) *False Alarm Rate.*—HF background noise occasionally produced false alarms. In 65 hours of operation (which corresponds to 62,400 frequency samples) the filter was incorrectly operated 24 times.

It is expected that improvements in the call sub-system, such as multi-tone calling and improved noise rejection would reduce the error rate and improve the detectability of the calling.

The ground-air communications center was equipped with a Log Periodic Antenna, a wide-band Power Amplifier and the required power supplies. Details of the equipment are as follows:

(1) Wide-band, wide beam, antenna
(2) Transmit/receive antenna switching
(3) Wide-band power amplifier
(4) Relay program control and interlock system
(5) Power supplies: 550 v. AC, 60 c.p.s., 3 phase; 208 v. AC, 60 c.p.s., 3 phase; 110 v. AC, 400 c.p.s., 1 phase; 110 v. AC, 60 c.p.s., 1 phase, 28 DC.
(6) Channel monitors
(7) Calibration system
(8) Transmit and receive teletype or voice on any of the 16 channels at any time.

Log Periodic Antenna, Model 747V3/30-*r-t* equipped with Model 518–1 balun transformer:

Impedance—50 ohms
Power rating—40 kw. PEP, 5 kw. average
Frequency range—3 to 32 mHz.
Polarization—Vertical
Directive gain—12 db above isotropic
Azimuth beam width—110° nominal
Elevation plane pattern—Maximum at 0° over perfect ground
Upper half point—22°
Back-to-front ratio—14 db nominal
Side lobe level—Minus 13 db nominal Transmit/Receive Relay, C. P. Clare, type HGS 2C–1001:

Mercury wetted contacts
One side stable DPST
Release time—1.4±.8 milliseconds
Power rating—250 watts CW Wide Band Power Amplifier, Canadian Marconi Company AN/SRA–502A:

Bandwidth—1.5 to 24.0 mHz.
Gain—Greater than 40 db
Response—Within 3 db throughout this bandwidth
Types of excitation—A1 (single tone), A2, (MCW), A3, (RT), F1, (FSK), A3*a* (SSB) or other transmission which can be accommodated within the bandwidth.
Minimum input level:
  (a) single tone 28 mw. input for 700 watts mean power
  (b) two tone input 10 mw. per tone for 100 watts peak power output.
Power output:
  (a) 1000 watts peak power when used with single exciter for SSB or A1.
  (b) 700 watts mean power when used with single exciter for operation where CW is transmitted.
  (c) 500 watts total mean power for multi-channel operation
Input impedance—50 ohms
Output impedance—50 ohms
Inter-modulation products:
  1.5 to 2.0 mHz. minus 30 db
  2.0 to 2.4 mHz. minus 35 db
Spurious frequencies—With 700 watts CW output
  Second harmonic:
    38 db up to 22 mHz.
    30 db between 22 and 28 mHz.
    38 db between 28 and 35 mHz.
    45 db above 35 mHz.
  Third harmonic:
    33 db up to 33 mHz.
    45 db above 33 mHz.

Stability—Stable under conditions of 2:1 mismatch open circuit load, and open circuit input.

HF Antenna Multicoupler, Technical Material Corporation, Canada, Limited:

Model—AMC6–2/75U, 6 outputs

Transceivers, Collins Radio RT5021/ARC505V:

Airborne SSB Transceiver 618T3
Frequency range—2.000 to 29.999
Frequency channels—28.000
Frequency stability—One part per million per month
Time required to change frequency—8 seconds
RF power:
- SSB 400 watts PEP±1 db
- AM 100 watts carrier
- CW 100 watts locked key RF output impedance—52 ohms
Audio input impedance—100 ohms unbalanced and 600 ohms balanced
Audio frequency response—5 db peak-to-valley ratio from 300 to 3000 c.p.s.
Sensitivity:
- SSB 1 microvolt for 10 db $S+N/N$ ratio
- AM 3 microvolts modulated 30%, 1000 c.p.s. for 6 db $S+N/N$ ratio Selectivity:
- SSB 2.85 kHz., 6 db down, 6.0 kHz., 60 db down
- AM 5.5 kHz., 6 db down, 14.0 kHz., 60 db down AGC characteristics—Maximum variation of audio output is 6 db for input signals from 10 to 100,000 microvolts, no overload below 1-volt signal output
IF and image rejection—80 db minimum
Audio output power—100 milliwatts into 300 ohm lead
Audio distortion—Less than 10%

Tone Intelligence Keyer, Technical Material Corporation Canada Limited:

Model—T1S–3 TH–39A/UGT
CW output frequency—1,000 c.p.s.
FAX output frequency shift—0 to 11 volts for a linear shift of 1000 c.p.s.
FSK output frequency shift—12 to 100 c.p.s., continually adjustable
Frequency stability—Better than 0.5% for 0–5° C. ambient temperature change ±10% line, voltage variation 0 to 95% relative humidity
Keying input—50 volt, 100 volt, 20 ma. (all neutral, floating, or either side grounded)
Keying speed—FSK—100 w.p.m., CW—250 w.p.m.
Output center frequencies—1900, 2000 or 2550 c.p.s.
Output impedance—600 ohm balanced
Output level—20 to 0 db continuously variable
Power input—115/220 volts, 50–60 c.p.s., single phase 100 watts continuous, 170 watts intermittent Frequency Shift Converter, Type 107, Model 2:

Input—Center frequency 2550 c.p.s., frequency shift 850 c.p.s.
Input level—20 to +30 VU (0 VU=1 mw.)
Input impedance—600 ohms
Keying speed—Up to 600 w.p.m.
Output:
- (a) neutral D.C. pulsed of 60 ma. into 1800 ohm external load, one side grounded
- (b) polar D.C. pulses of ±30 ma. 1800 ohm load, center grounded Output impedance—100 to 100,000 ohms
Power requirements—110 v. AC, 60 c.p.s., 85 watts Teletype Page Printer, Teletype Corporation of America, Model 15

Programmer Master Clock IBM Model 91.2

Program Drum Selector IBM Model 666

Channel Monitors Sanborn Paper Records Model 320

Calibrator RF Signal Generator, Hewlitt Packard Model 606A

RF Micro Voltmeter, Rhode and Schwartz, type U/S, VB.BN 1521

Oscilloscope, Tektronic Incorporated, type 535

Attenuators, Hewlitt Packard, type 355C and 355D

Relay Control and Interlock System:

The antenna relays had to be rigidly controlled for all modes of operation, so an interlock system of relays was implemented to provide adequate protection for the various equipments regardless of their off or on states.

The initial timing for the Ground Station was derived from CHU time signals on 3.330, 7.335, or 14.670 mHz. This was used to manually synchronize the Channel Sounder clock system. Once the Channel Sounder timing was set up, it provided a timing control for the two minute cycle and was used to initiate the antenna and modulator relays.

The Channel Sounder two minute cycle was controlled by the IBM program drum to either of the two states for a predetermined time. In addition, all the foregoing program could be overridden by a manual switch at any time. During the optional period, or a period selected by the manual control, separate transmissions could be made with the communications circuit on any channel.

During the trials (i.e., tests) the SFT$x$ was programmed to operate on an hourly schedule, being turned on every 2 minutes between $H+00$ and $H+24$, and between $H+50$ and $H+56$. Each sound sequence required 64 seconds, the remaining 56 seconds being available for transmissions of test messages from the aircraft to the ground station. The time between $H+24$ and $H+40$ was required for normal operational traffic. The time between $H+40$ and $H+50$ was allotted for the transmission of test messages by the unaided radio officer. The channels were re-evaluated during the period $H+50$ to $H+56$, to establish a new set of channel quality predictions for the next 24 minute test schedule.

Three test messages were transmitted during the period $H+00$ to $H+24$, on each of 4 channels selected as follows:

During earlier flights: (1) the predicted best channel, (2) a predicted poor channel, (3) a predicted marginal channel, and (4) a channel above the indicated MUF.

During the later flights: (1) the predicted best channel, (2) a predicted poor channel, (3) the predicted second best channel, and (4) the revised best channel based on evaluations during the period $H+00$ and $H+16$. (This was made possible by the introduction of the air-ground call facility.)

It should be noted that this program involved more complex procedures than would be required operationally.

The CHEC system as used in the trials comprised the evaluation sub-system which displayed to the aircraft radio operator his usable channel, and the air-ground call sub-system which allowed the operator to signal, to the ground or the GSF receiver, his desire to communicate on a given channel. Calling facility from ground to air can also be provided by the above-mentioned equipment, with only very minor additional equipment (tone generators and detectors). This ground-air call sub-system would facilitate:

(a) Call to a specific aircraft on a specific assigned frequency. This would normally cause difficulty if the aircraft receiver is not tuned to that frequency, or if an immediate reply to an air-ground call is required and no ground communications transmitter is tuned to the necessary frequency.

(b) Call to a specific aircraft where the channels open to the aircraft are not known to the ground station—in other words, where an all-frequency call is desired.

The ground-air call sub-system may be included in a complete CHEC system. The normal ground-air evaluation tone sequence will probably have to be modified to include positions for ground-air call tones. Each aircraft will be assigned a specific set of call tones, and on command from the ground station, these extra tones will be added to the SF transmitter signals and received by all ASF receiver-equipped aircraft. In each aircraft, tone decoders will respond to the tone sequence for that particular aircraft, giving a lamp indication of the channel (or channels) on which that aircraft is being called. Because of the stepped nature of the SF transmitter and ASF receiver, a call can be arranged on any or all channels.

It should be noted that these calling facilities may be obtained with only very minor additions (tone sources and detectors) to the basic channel evaluation equipment.

During the tests, some possible modification or improvements were considered. In the constructed system, two controls had to be adjusted for the *S/I* threshold setting: the acceptable signal level received at the aircraft, and the acceptable ground interference level (GIL) at the ground. These two measurements were displayed via separate lamps, two for each channel; when both lamps for a given channel were lit, the *S/I* ratio for that channel was acceptable. This method had two difficulties. First, with the threshold setting controls it was more complicated than desirable. Secondly, a channel could be rejected even though it had an acceptable *S/I* ratio. For example, this rejection could occur if the GIL and the received signal strength were both considerably higher than usual. The high GIL would cause the channel to be rejected even though the ratio of *S/I* was acceptable. These disadvantages may be obviated or reduced by the following techniques:

(a) Only one manual control to be used to set the acceptable threshold for the ratio *S/I*.

(b) The relative positions in the timing sequence of the reference 75 c.p.s. tone and the GIL tone could be interchanged so that the GIL tone is transmitted.

(c) The decoded GIL tone could be used to automatically adjust the acceptable signal level on each frequency. This could be effected by controlling the attenuator between the receiver and the antenna (during the signal strength measurement) so that it is automatically adjusted by the decoder GIL level. Thus if the GIL on a channel is 6 db above the average, 6 db more signal will be acceptable on that channel.

(d) The display could consist of one lamp for each assigned frequency, indicating simply an acceptable *S/I* ratio.

The clock synchronization could be improved by reducing the number of steps in the manual procedure to two: (1) synchronizing the 1 c.p.s. output, and (2) synchronizing the remaining counting chain.

Provision for battery standby operation of the clock is also possible, particularly for short stopovers of the aircraft in areas where appropriate standard time signals are not available for re-synchronization.

It may be desirable to have the sounding and calling information still available when teletype communications have become unsatisfactory because of poor signal strength. To this end, the ability of the GSF receiver and ASF receiver should, if desired, be such that they can detect signals in a noisy background:

(a) A 400 Hz. IF bandwidth could be used in the ASF receiver. This tenfold reduction for the above-mentioned bandwidth of 400 Hz. would permit the use of 10 db more receiver gain and would thus improve the ASF receiver sensitivity to sounding transmissions by 10 db.

(b) The IF of the GSF receiver must remain at least 3000 Hz. wide to monitor the noise in the assigned upper sidebands. However for increased airground call sensitivity, an additional IF amplifier with a bandwidth of 400 Hz. may be used in parallel with the 3000 Hz. IF, to drive the tone detection circuitry. This would improve the sensitivity of this system by 10 db.

The statistical results of the trials indicated that a more accurate prediction of channel reliability could be made on the basis of several consecutive channel evaluations, rather than from a single evaluation. To assist in the recording of past evaluations a mechanical readout, such as multi-channel chart paper may be provided, so that past data can be readily viewed by the radio operator. As a second, but perhaps not so desirable alternative, the memory function could be achieved electronically with a weighted average of previous samples displayed via lamps.

With the introduction of ground-air calling, it may be desirable to modify the timing sequence to allow more efficient use of sounding time, and so to provide more frequent soundings. Fifteen (or twelve) channel operations would allow a sounding repetition rate at each frequency of once each minute, with four (or five) seconds prior to the sounding transmission on that channel. Using faster response one could transmit up to three call tones, two GIL tones, and one signal tone consecutively on each channel.

The following minor changes are also possible in systems according to the present invention:

The tone frequencies may be generated by counting down from the clock oscillator chain. This should give very stable tone frequencies (1 part in $10^7$) at probably less cost than tuning fork oscillators.

Narrow band, twin T, active filters could replace the tuning fork tone detectors, possibly providing improved uniformity and design flexibility, lower rise time, and wider dynamic range.

The 10 parallel RF filter amplifiers (one for each aeronautical band) could be replaced with 10 parallel RF filters and a single wideband amplifier, with maybe a great reduction in size and cost.

If cross-modulation should continue to be a problem even with the preselecting RF filters, a field-effect transistor could be considered for the first RF stage.

If an inexpensive frequency synthesizer were available, the 16 crystal-controlled local oscillators could be replaced. Failing this an appreciable reduction in total power consumption may be achieved if temperature compensated crystal oscillators were used in place of the oven controlled units. The added cost would perhaps be most easily justified for the clock oscillator where battery standby operation is desirable.

If desired, the airborne electronics package may be operated remotely from the display. Modular construction may also be used in the GSF and ASF receivers, to to permit each change of tuning frequencies, simplicity of maintenance, and to reduce sub-system interference.

The critical path in some environments may well be the air-ground link, requiring the estimate made of *S/I* to be made at the ground terminal. In the trials, the measurement of channel background noise at the aircraft was found to be unnecessary; facilities for this measurement may, therefore, not be necessary in all applications of the present invention.

Inverter-operated power supplies were used in the trials equipment to achieve small size. However, if 28 v. D.C. is available in the aircraft, background noise may be reduced by removing these invert supplies from the ASF receiver. Size is of little importance in the ground stations, so the much simpler 60 Hz. power supply would be convenient here (for GSF receiver, etc.).

It is believed that a measurement error may arise if due to imperfect synchronism of the ASF receiver and SF transmitter the signal tone is transmitted while the signal attenuator and noise generator are not in operation. To permit a reasonable inaccuracy of synchronism and yet to prevent this overlap from occurring, it may be possible to operate the attenuator and noise generator for a period 100 milliseconds longer than the signal tone transmission.

Integrated circuits may be considered for the countdown circuitry in the clock and programming systems, in the interest of economy. In addition, whatever the clock configuration, it may be possible to have a synchronization control to allow phase advance, as well as the phase retard in the system described above.

Furthermore, the display output may, if desired, be stored in a thyristor (SCR) memory, rather than in bistable transistor circuitry.

Transmission of GIL tones and clock synchronization between the GSF receiver and SF transmitter sites may be provided especially if they are some distance apart.

The CALL system mentioned above may well be useful if installed without the evaluation system. Certainly the air-ground calling facility could be installed much more simply than the full CHEC system, requiring only the installation of small tone generators in the aircraft and a stepped-frequency monitoring receiver at the ground terminal. This simple installation, however, may well be of only limited value since it is unlikely to solve a basic HF communications problem—i.e., the unpredictability of channels during disturbed propagation conditions, and the present inability of the radio officer in an aircraft to know which channel(s) are open during disturbed conditions except by time-consuming hunt-and-try methods.

The air-ground call facility however will be of special value when it is used in a full CHEC system—i.e., as a means by which a radio officer in an aircraft can signal his choice of channel(s) to the ground, this choice being made on the basis of the CHEC channel evaluation display. It should also be noted that the complete calling facility, including ground-air calling, can probably only be implemented with the full CHEC system equipment.

In the above-mentioned trials utilizing an embodiment of this invention, several advantages became evident over and above a previously used system. Some of these advantages are set forth below:

(a) An improvement was observed in the reliability of communications (during disturbed, rapidly changing, or otherwise abnormal propagation conditions).

This improvement would appear to be due to effective selection of available operating frequencies at those times when frequency prediction charts or prearranged operating frequency schedules are useless. Arbitrary hunt-and-try methods by aircraft radio officers are often ineffective under these conditions, and long communications outages can result. Conclusive evidence for this advantage was obtained in earlier air-ground-air trials. When propagation conditions were good the unaided radio officer was able to maintain effective contact, while during distrubed conditions the use of sounding information according to the present invention increased contact time by up to 50%.

(b) The time to achieve radio contact and pass traffic under undisturbed conditions was reduced.

Sounding reduces or eliminates the requirement to select frequencies by manual, hunt-and-try methods. The presentation of CHEC system information allows nearly instantaneous selection of optimum frequencies. The delays in use of a communications frequency are then reduced to (1) the time to make a decision on which frequency to use (a few seconds), plus, (2) the time to set up manually, and use, the airborne (618T) transceiver (a few tens of seconds) thus, a total time of much less than one minute. On the other hand, conventional methods of frequency selection require manual, hunt-and-try procedures which in the end may be successful but may consume many minutes before a satisfactory channel is selected, even during undisturbed, slowly changing propagation conditions. Furthermore, on initial contact, the radio officer has no assurance his traffic will be copied successfully at the ground station. The CHEC system provides a highly accurate prediction of channel performance before the traffic is sent. In specific tests much better results were obtained by a radio officer using a system according to the present invention as opposed to a radio officer who was using conventional techniques.

It is not, of course, intended to imply that channel sounding is the only reliable method of maintaining communications with the ground. Given a family of frequencies and unlimited time to establish contact, hunt-and-try methods are effective and, of course, are simply a more time consuming form of channel evaluation. It is believed, however, that the present invention provides a method for substantially immediate contact and communications (when propagation is possible). If the traffic is urgent or sensitive, this operational advantage is obvious.

(a) Some possible advantage of the Calling System used in the trials may be summarized as follows:

*Air-Ground.*—It provides the means to alert the ground station of the intention of the aircraft radio officer to communicate and the frequency that will be used.

*Ground-Air.*—It provides means for calling on any or all frequency assignments, either (i) a particular aircraft or (ii) all aircraft in a communicating network.

(b) The frequency diversity of the calling feature, provides an extremely effective means of establishing contact with the minimum of delay. It removes the requirement for ground station personnel to manually guard a number of channels, and also allows the radio officer in the aircraft to proceed with other duties with the knowledge that if the ground station is calling his aircraft he will be made aware of this automatically.

(c) The proposed calling system is relatively simple, compared to its full potential. In a more sophisticated system, it would be possible for A/G/A traffic to be handled with automatic interrogation and response.

It would appear that the advantages obtained during the above-mentioned trials may well be obtained in other tests of apparatus according to the present invention. This possibility will be increased if the following points are kept in mind:

(a) Before operational use, an appropriate calibration of the system is made for the particular configuration and modem (modulation/demodulation) employed.

(b) The antenna for the ground stepped frequency transmitter should preferably have horizontal and vertical directivity patterns closely similar to the patterns for the antenna used with the communications receivers. This is possible if these are both vertically polarized wide azimuthal antennae.

(c) The bandwidth of the ground interference receiver should preferably be matched to the appropriate bandwidth of the communication receiver(s).

(d) The transmitter power levels and the evaluation receiver gains should preferably be monitored from time to time to ensure that no appreciable system changes have taken place.

(e) Channel evaluation is based on a series of *S/I* readings accumulated over several minutes. In the above-mentioned trials, four consecutive readings were found to provide reliable prediction.

It will be appreciated that, in the trials, the described embodiment provided:

(1) Sounding directly at the frequencies of interest, using narrow-band DSBSC modulation, in such a way as to leave normal communications undisturbed.

(2) Provision of a stepped frequency monitor receiver at a station or terminal A to measure the background interference on each channel at that terminal and signalling those interference levels via the sounding transmission to a receiver at a station terminal B by using a prearranged set of tone frequencies. A further tone was also transmitted on each channel to permit the receiver at terminal B to identify the transmitting station and to measure the received signal level on each channel over the path. These tones are detected and decoded by the receiver at terminal B.

This evaluation channel was also used to convey other limited information using the tone signalling—for e.g. (a) calling from A to B and (b) message acknowledgment. In addition, because the monitor receiver at terminal A is capable of receiving any transmissions on the channels through which it is stepped, it was therefore proposed to use it for reception of narrow-band, short duration messages from a transmitter at terminal B—for e.g. intention to communicate on a given channel.

(3) Presentation at terminal B of this information as the ratio *S/I* for each channel where S is the estimated receiver signal level at terminal A for a transmission from terminal B, based on the signal level measurement at terminal B, and I is the background interference level at terminal A.

The operator at terminal B chose a minimum acceptable (threshold) level of *S/I*, and a display showed those channels having an *S/I* ratio exceeding this threshold.

We claim:

1. Apparatus arranged to evaluate a plurality of communication channels between a first point and a second point, and including:
(a) a first transmitter arranged at the first point;
(b) transmitter switching means by which the first transmitter can be caused to transmit a signal over a selected one of a plurality of radio communication channels;
(c) a first receiver located at the second point;
(d) receiver switching means by which the first receiver can be caused to receive a signal over the said selected one of the said channels;
(e) operating means arranged to operate the said transmitter switching means to cause the transmitter to transmit on each of the channels in succession;
(f) a second receiver at the first point;
(g) noise level measuring means a the first point and including the second receiver;
(h) encoding means at the first point arranged to encode the output of the noise level measuring means for each channel in turn;
(i) modulating means arranged to receive the output of the encoding means and to cause the transmitter to transmit the encoded information on the channel in use;
(j) decoding means at the second point arranged to receive the output from the first receiver and to decode the information as to the noise level at the first point;
(k) synchronising means arranged to step the first receiver from channel to channel in synchronisation with the first transmitter, whereby it receives signals on that channel on which the transmitter is transmitting;
(l) signal level measuring means at the second point and arranged to receive the output from the first receiver; and
(m) indicating means at the second point arranged to receive both the output from the decoding means and the output from the signal level measuring means, and to provide an indication as to on which channel or channels the predicted signal-to-noise level is above a predetermined level and high enough for reliable communication.

2. Apparatus according to claim 1, and in which:
(a) part of the synchronizing means at the first point operates by synchronizing the first transmitter to an international time signal; and
(b) part of the synchronizing means at the second point operates by synchronizing the first receiver to that international time signal.

3. Apparatus according to claim 1, and in which:
(a) a third receiver is located at the first point;
(b) a second transmitter is located at the second point;
(c) a fourth receiver is located at the second point;
(d) a third transmitter is located at the first point;
(e) the third transmitter being a stepped-frequency transmitter;
(f) the second receiver and the fourth receiver being stepped-frequency receivers;
(g) the second transmitter being arranged for the transmission of messages to the third receiver; and
(h) the third transmitter being adapted to transmit on each of said channels in succession a signal to the fourth receiver indicative of the magnitude of the noise level measurement for the respective channel.

4. Apparatus according to claim 1, and in which:
(a) measuring means at the second point are arranged to measure the apparent noise level in signals received at the second point; and
(b) indicating means at the second point are arranged to provide an indication as to the channel or channels on which the signal-to-apparent noise level ratio at the second point is above a predetermined level and is high enough for reliable communication.

5. Apparatus according to claim 1, and in which:
(a) a lamp is provided at the second point for each of the said channels;
(b) the said indicating means includes the said lamps; and
(c) each lamp is illuminated when the predicted signal-to-noise level on the associated channel is above the predetermined level.

6. Apparatus according to claim 1, and in which:
(a) signal means are arranged to transmit between the two points an indication as to which communication channel is to be used.

7. Apparatus according to claim 4, and in which:
(a) a ground station is the first point;
(b) an aircraft is the second point;
(c) an air-ground-air communication system links the ground station to the aircraft;
(d) an antenna system is associated with the second receiver;
(e) fifteen narrow-band-pass filter stages are provided at the ground station;
(f) fifteen lines connect the antenna system respectively to the fifteen filter stages;
(g) an amplifier stage is provided;
(h) switching means are arranged to connect a selected one of the filter stages to the amplifier stage;
(i) local oscillator is provided;
(j) a mixer stage is arranged to receive an output from the local oscillator and an output from the amplifier stage;
(k) an intermediate frequency stage is arranged to receive an output from the said mixer stage;
(l) an audio detector stage is arranged to receive an output from the intermediate frequency stage;
(m) a call display unit is provided;
(n) a memory facility is provided in the display unit;
(o) the display unit receives an output from the audio detector stage;
(p) an automatic gain control (AGC) detector is arranged to receive the output for the intermediate frequency stage;
(q) an AGC filter and amplifier stage is arranged to receive the output from the AGC detector;
(r) a tone selection and synchronization stage is arranged to receive the output from that amplifier stage; and
(s) that stage is operable to supply coded tone signals to the third transmitter.

8. Apparatus according to claim 7, and in which:
(a) time synchronization means are included in the third transmitter;
(b) a mixer stage of the third transmitter has an input capable of being supplied with signals as specified from the output of the tone selection and synchronization stage; and
(c) this stage is capable of supplying an output corresponding to the coded tone signals for transmission between the first point and the second point.

9. Apparatus according to claim 8, and in which:

(a) an antenna stage is included in the fourth receiver;
(b) a band pass filter stage is included in the fourth receiver with its input connected to the antenna stage;
(c) an automatic attenuator stage is electrically connected to the output of the said band pass filter stage;
(d) a wide band RF amplifier stage is connected to the output of the said attenuator stage;
(e) a local oscillator stage;
(f) a balanced mixer stage receiving outputs from the local oscillator stage and the RF amplifier stage;
(g) an intermediate frequency (IF) stage arranged to receive an IF input from the mixer stage;
(h) an audio detector stage connected to the output of the said IF stage;
(i) a tone filter and detection stage arranged to receive a input signal from the audio detector stage;
(j) a display stage;
(k) memory facilities incorporated in the display stage;
(l) the output from the audio detector stage being applied to the said display stage; whereby
(m) the display stage is capable of providing a display indication as to on which of the communication channels the signal-to-noise ratio is high enough for reliable two-way communication between the first and second points.

10. A method capable of evaluating a plurality of communication channels between a first point and a second point to ascertain the communication channel or channels on which the signal-to-noise ratio is high enough for reliable communication between the two points, including the steps of:
(a) providing a first transmitter at the first point capable of transmitting a signal over each of the plurality of communication channels between the two points;
(b) providing a first receiver at the second point capable of receiving signals over the said channels from the transmitter;
(c) measuring the noise level on each channel in succession at the first point;
(d) encoding the noise level measurement for each channel and causing the transmitter to transmit the encoded information on that channel;
(e) decoding the encoded information at the second point;
(f) synchronising the receiver with the transmitter, whereby it is capable of receiving signals on that channel on which the transmitter is transmitting;
(g) measuring the signal level at the second point on each channel; and
(h) providing an indication as to on which channel or channels the predicted signal-to-noise level is above a predetermined level and high enough for reliable communication.

11. The method according to claim 10, including the step of synchronizing the transmitter and the receiver to an international time signal.

12. The method according to claim 10, including the steps of:
(a) measuring the apparent noise level in signals received at the second point and providing an indication as to on which channel or channels the signal level-to-apparent noise-level ratio at the second point is above a predetermined value and high enough for reliable communication.

13. The method according to claim 10, including the step of providing a call signal for transmission to provide an indication as to which communication channel is to be used for transmission.

14. The method according to claim 10, and in which the measurement of the signal level at the second point is effected by:
(a) passing the received signal through a variable attenuator;
(b) combining the attenuated signal with a fixed amount of "noise";
(c) measuring the total combined signal; and
(d) variation of the degree of attenuation by the variable attenuator to produce a desired level of total output signal;

the setting of the variable attenuator then providing the required measure of the signal level.

References Cited

UNITED STATES PATENTS

| | | | |
|---|---|---|---|
| 2,521,696 | 9/1950 | Armond | 325—56 |
| 2,694,140 | 11/1954 | Gilman et al. | 325—51 |
| 3,160,813 | 12/1964 | Biggi et al. | 325—56 |
| 3,403,341 | 9/1968 | Munch | 325—56 |

FOREIGN PATENTS

| | | |
|---|---|---|
| 586,315 | 3/1947 | Great Britain. |

OTHER REFERENCES

R. V. Locke, Proc. of the IRE, Experimental Comparison of Equal Gain, V48, N8, August 1960, Class 325/56.

RICHARD MURRAY, Primary Examiner

A. J. MAYER, Assistant Examiner

U.S. Cl. X.R.

325—51, 53, 55, 58, 64, 65, 67